United States Patent
Kitazawa

(10) Patent No.: US 6,746,524 B1
(45) Date of Patent: Jun. 8, 2004

(54) PROCESS FOR PRODUCING SINTERED COLOR PENCIL LEAD

(75) Inventor: Katsunori Kitazawa, Takasaki (JP)

(73) Assignee: Mitsubishi Pencil Kabushiki Kaisha, Toyko (JP)

(*) Notice: Subject to any disclaimer, the term of this patent is extended or adjusted under 35 U.S.C. 154(b) by 0 days.

(21) Appl. No.: 09/979,774

(22) PCT Filed: May 16, 2000

(86) PCT No.: PCT/JP00/03138
§ 371 (c)(1),
(2), (4) Date: Nov. 28, 2001

(87) PCT Pub. No.: WO00/73394
PCT Pub. Date: Dec. 7, 2000

(30) Foreign Application Priority Data

May 28, 1999 (JP) ............................................ 11-149188

(51) Int. Cl.⁷ .............................................. C09D 13/00
(52) U.S. Cl. .................... 106/31.11; 106/493; 106/496; 106/497; 106/498
(58) Field of Search .............................. 106/31.11, 493, 106/496, 497, 498

(56) References Cited

U.S. PATENT DOCUMENTS

| 5,595,589 A | * | 1/1997 | Hoshiba et al. | .......... 106/31.11 |
| 5,645,629 A | * | 7/1997 | Kitazawa et al. | ......... 106/31.11 |
| 5,855,662 A | * | 1/1999 | Brand et al. | ................ 106/498 |
| 6,465,540 B1 | * | 10/2002 | Kubo et al. | .................. 522/100 |

FOREIGN PATENT DOCUMENTS

| DE | 19830929 | 1/1999 |
| EP | 0712914 | 5/1996 |
| JP | 8-48931 | 2/1996 |
| JP | 8-143810 | 6/1996 |
| JP | 8-143811 | 6/1996 |
| JP | 8-143812 | 6/1996 |
| JP | 8-259874 | 10/1996 |
| JP | 9-67540 | 3/1997 |
| JP | 2000-17220 | 1/2000 |
| JP | 2000-17221 | 1/2000 |

* cited by examiner

Primary Examiner—Mark L. Bell
Assistant Examiner—Veronica F. Faison
(74) Attorney, Agent, or Firm—Burns, Doane, Swecker & Mathis, LLP

(57) ABSTRACT

Disclosed is a process for producing a sintered color pencil lead characterized by pigmenting a white or light-colored porous sintered pencil lead with an organic pigment by treating said porous sintered pencil lead with a solution of at least one compound of the following Formula (I) to be filled with said compound and then by forming said organic pigment within the pores by means of heating, A(B)x in which x is an integer from 1 to 8, A is the radical of a chromophore of the quinacridone, anthraquinone, perylene, indigo, quinophthalone, indanthrone, isoindolinone, isoindoline, dioxazine, azo series, phthalocyanine or diketopyrrolopyrrole which is attached to x groups B via one or more heteroatoms selected from the group consisting of N, O and S and forming part of the radical A, B is hydrogen or a group of the formula

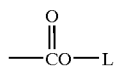

where at least one group B is not hydrogen and, if x is 2 to 8, all the groups B can be identical or different, and L is any suitable solubilizing group.

8 Claims, No Drawings

PROCESS FOR PRODUCING SINTERED COLOR PENCIL LEAD

TECHNICAL FIELD

The present invention relates to a process for producing a sintered color pencil lead which can draw lines having excellent light fastness and weatherability while having a vivid coloring property and a sufficiently high density in drawn lines and is excellent in a mechanical strength such as a bending strength and which can readily be erased with an eraser and is particularly suited as a fine size color pencil lead for a mechanical pencil.

BACKGROUND ART

Conventional sintered color pencil leads are used for mechanical pencils in many cases, and a production process therefor includes a principal production process in which a blend composition comprising an filler such as boron nitride and a binder such as clay is kneaded, extruded and then subjected to heat treatment to prepare a porous lead and in which an ink comprising a dye is filled into pores of this lead.

However, since the colorant is a dye, the problem with the dye is that the stability with the passage of time such as light fastness is inferior. Further, if a lead has pores having a size at the level in which the pores can be impregnated with a pigment-dispersed ink, the lead is weak in strength and can not serve as a practical lead for a mechanical pencil.

The present applicant has heretofore filed Japanese Patent Application Laid-Open No. Hei 8-48931, Japanese Patent Application Laid-Open No. Hei 9-67540, Japanese Patent Application Laid-Open No. Hei 2000-17220 and Japanese Patent Application Laid-Open No. Hei 2000-17221 in connection with methods for obtaining a lead having a high strength. In all of these methods, obtained are sintered leads which can be impregnated with a pigment-dispersed ink so as to provide drawn lines with a high density and which is stronger in strength than the practical level applicable to a lead for a mechanical pencil. However, further desired is a sintered lead whose density in drawn lines thereof is further more improved and whose strength is further more than the practical level.

Further, the present inventors have filed Japanese Patent Application Laid-Open No. Hei 8-143810, Japanese Patent Application Laid-Open No. Hei 8-143811, Japanese Patent Application Laid-Open No. Hei 8-143812 and Japanese Patent Application Laid-Open No. Hei 8-259874 in connection with methods for producing organic pigments in pores of a porous lead for a mechanical pencil by chemical reaction. These methods have made it possible to impregnate pores of a lead having a small pore diameter with an organic pigment. However, problems with these methods are that, since the reaction is carried out in the presence of a strong acid or a strong base, the leads are liable to be a little deteriorated and that, since the production process is different according to each pigment, mixing color and producing multiple color are difficult.

DISCLOSURE OF THE INVENTION

An object of the present invention is to solve the defects of the sintered color pencil leads produced by the conventional techniques described above and further improve the prior art of the present inventors described above and to provide a process for producing a sintered color pencil lead which can draw lines having excellent light fastness and weatherability while having a vivid coloring property and a sufficiently high density in drawn lines and is excellent in a mechanical strength such as a bending strength and which can readily be erased with an eraser.

The present inventors have done intensive researches in order to solve the problems described above. As a result, they have found that the above problems can be solved by filling pores of a white or light-colored porous sintered lead with a specific compound and pigmenting the compound by heating, and thus they have come to complete the present invention.

That is, a process for producing a sintered color pencil lead characterized by forming a white or light-colored porous sintered pencil lead that is pigmented with an organic pigment by treating said porous sintered pencil lead with a solution of at least one compound of the following Formula (I) to be filled with said compound and then by forming said organic pigment within the pores by means of heating, $$A(B)x \qquad (I)$$

in which x is an integer from 1 to 8,

A is the radical of a chromophore of the quinacridone, anthraquinone, perylene, indigo, quinophthalone, indanthrone, isoindolinone, isoindoline, dioxazine, azo series, phthalocyanine or diketopyrrolopyrrole which is attached to x groups B via one or more heteroatoms selected from the group consisting of N, O and S and forming part of the radical A, B is hydrogen or a group of the formula

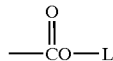

where at least one group B is not hydrogen and, if x is 2 to 8, all the groups B can be identical or different, and L is any suitable solubilizing group.

To be more specific, pores of a white or light-colored porous sintered lead comprising a colorless or white filler and silicon nitride prepared from a starting material of perhydropolysilazane which is a binder may be filled with a solution prepared by dissolving the compound (I) described above in an organic solvent and pigmented by heating.

BEST MODE FOR CARRYING OUT THE INVENTION

The embodiment of the present invention shall be explained below in detail.

A process for producing a sintered color pencil lead characterized by forming a white or light-colored porous sintered pencil lead that is pigmented with an organic pigment by treating said porous sintered pencil lead with a solution of at least one compound of the following Formula (I) to be filled with said compound and then by forming said organic pigment within the pores by means of heating, $$A(B)x \qquad (I)$$

in which x is an integer from 1 to 8,

A is the radical of a chromophore of the quinacridone, anthraquinone, perylene, indigo, quinophthalone, indanthrone, isoindolinone, isoindoline, dioxazine, azo series, phthalocyanine or diketopyrrolopyrrole which is attached to x groups B via one or more heteroatoms selected from the group consisting of N, O and S and forming part of the radical A, B is hydrogen or a group of the formula

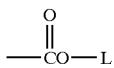

where at least one group B is not hydrogen and, if x is 2 to 8, all the groups B can be identical or different, and L is any suitable solubilizing group.

In a process for producing a sintered color pencil lead in accordance with the present invention, a white or light-colored porous sintered lead is formed and pores of the white or light-colored porous sintered lead are filled with a solution prepared by dissolving at least the compound (I) described above in an organic solvent and pigmented said compound in said pores by heating.

In the present invention, the porous sintered lead is formed from a colorless or white filler which is a publicly known substance, such as boron nitride, talc and mica and a binder such as silicon nitride, silica, alumina and zirconia and a solid solution thereof or clay. In particular, preferably suitable in terms of strength is a lead comprising a binder of silicon nitride prepared from perhydropolysilazane used as a starting material, which is disclosed in Japanese Patent Application Laid-Open No. Hei 8-48931.

The filler shall not specifically be restricted as long as it has heretofore been used as an filler for a sintered color pencil lead and is colorless or white, and any substances can be used. For example, the filler described above can be used, and it is a matter of course that a mixture of several kinds thereof can be used. Further, silica and alumina can be used as the filler depending on the kind and the sintering temperature of the binder.

A pore diameter of the porous color pencil lead used in the present invention shall not specifically be restricted as long as it can be impregnated with a solution prepared by dissolving the compound of Formula (I) in an organic solvent. However, a minimum value of the pore diameter is considered to be about 0.1 μm, so that it is preferable to use those in which all pore diameters are 0.1 μm or more. Taking a distribution of the pores into consideration, if the pores having a diameter falling in a range of smaller than 0.1 μm are distributed in a large number, then the pores which can not be filled with a pigment increase to deteriorate the coloring property, and therefore it is preferable that the pores having a diameter of smaller than 0.1 μm account for 40% or less, more preferable 20% or less based on the total volume.

Considering strength of the lead, the pore diameter has preferably a maximum value of 0.4 μm or less.

Considering the coloring property onto a paper surface, the porosity distributing in a range of 0.1 μm or more and 0.4 μm or less, preferably 0.1 μm or more and 0.3 μm or less in the pore diameter of the porous pencil lead accounts for preferably 10 vol % or more, more preferably 15 vol % or more based on a volume of the lead.

In the present invention, the sintered color pencil lead is obtained by impregnating and filling the pores of the sintered lead described above with the compound of Formula (I) dissolved in an organic solvent and then heating the lead to convert the compound into an organic pigment.

The group A of the Formula (I) is a publicly known chromophore having a basic structure:

for example, a residue of compounds described below and all publicly known derivatives thereof. Classification of the following compounds by item is not based on chemical classification.

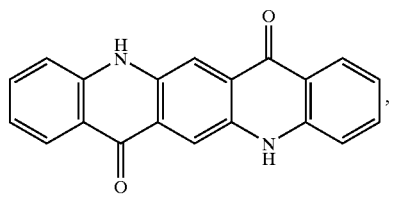

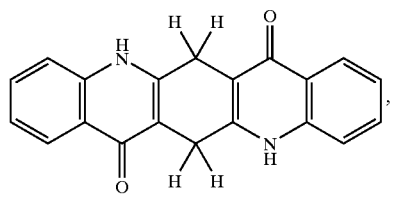

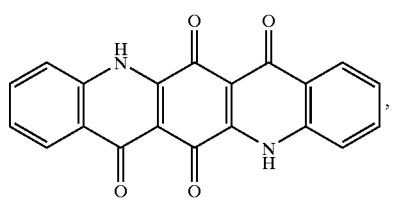

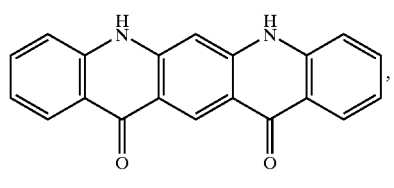

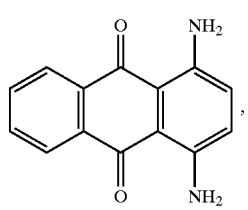

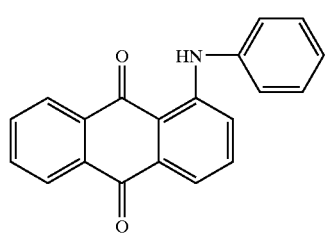

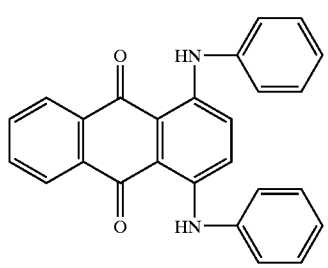
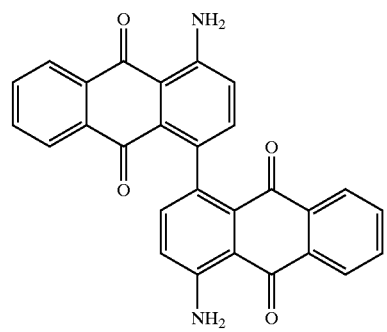
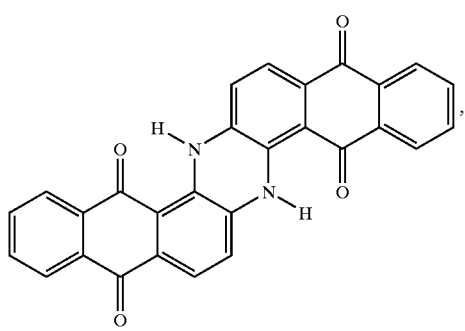
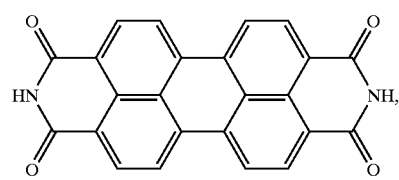
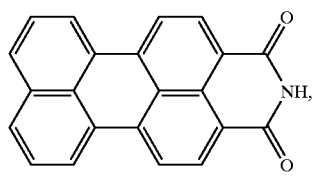
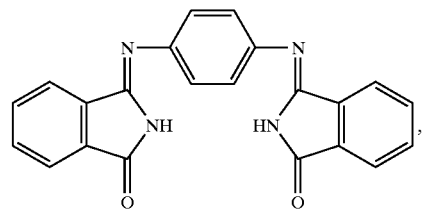
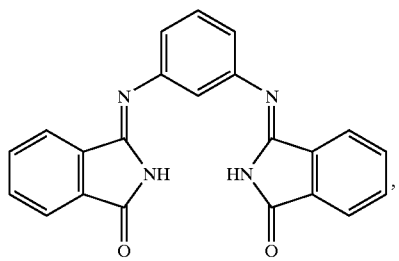
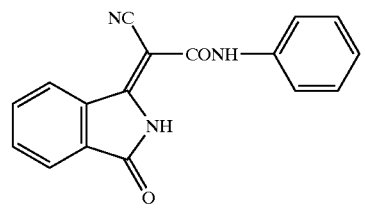
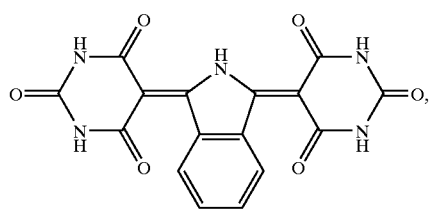
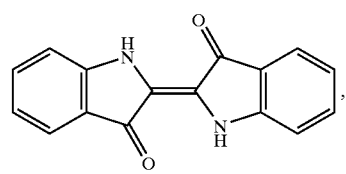
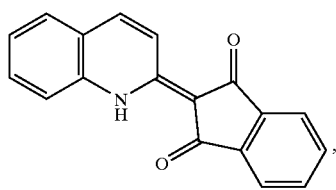
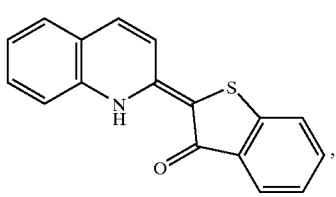

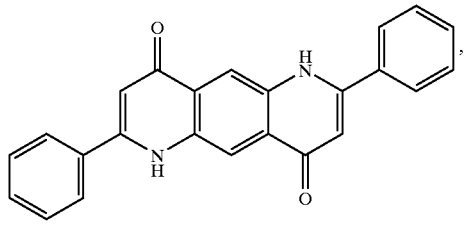
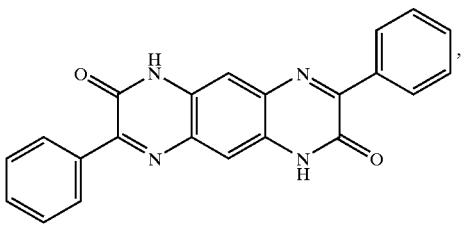
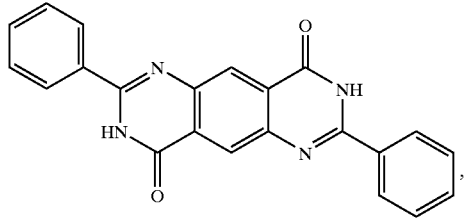
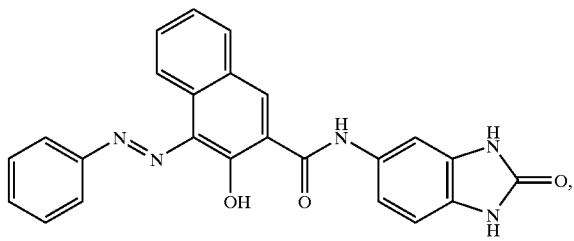
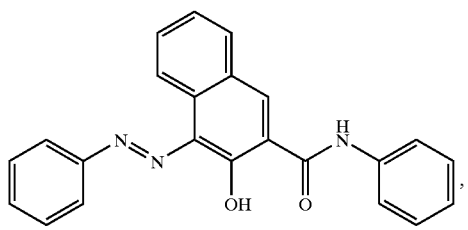
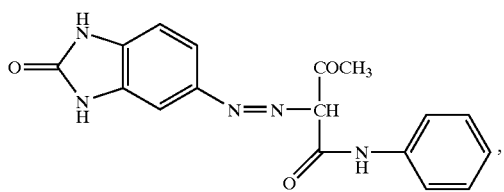
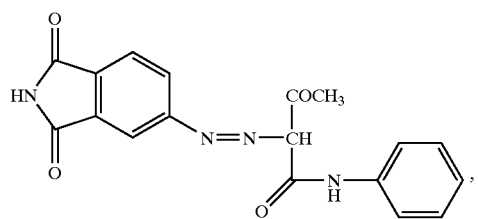
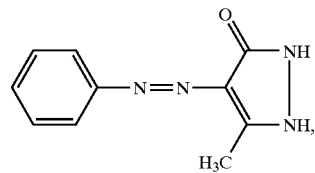
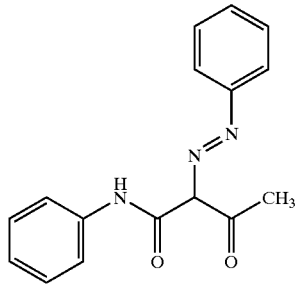
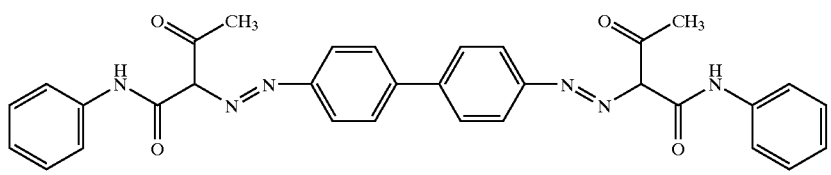
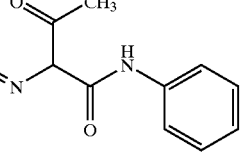
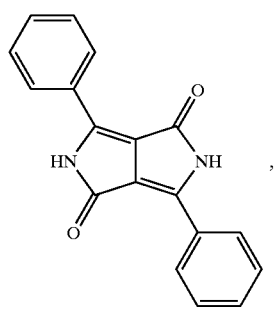
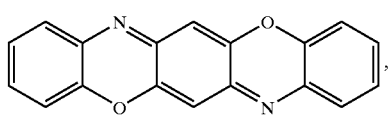

-continued

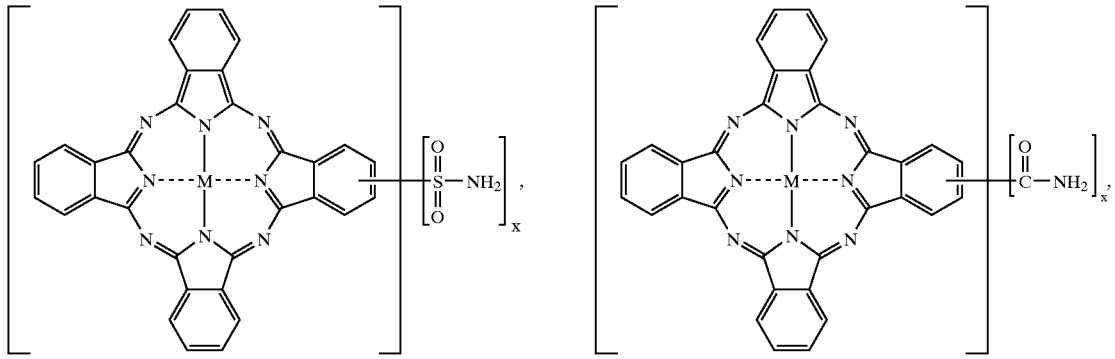

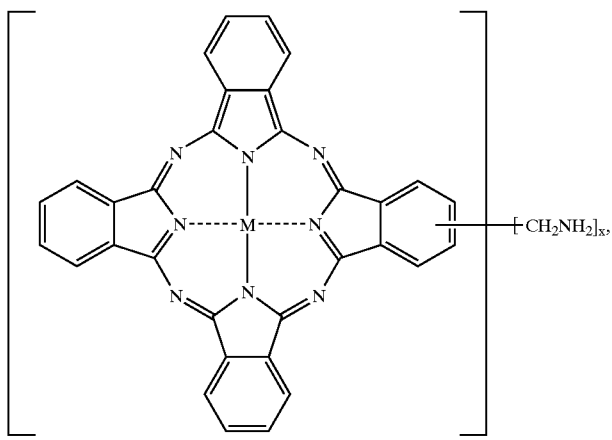

In the present invention, the groups of the preferred compounds of Formula (I) shall be shown in the following a) to l).

a) Perylencarboximides of the following formulae:

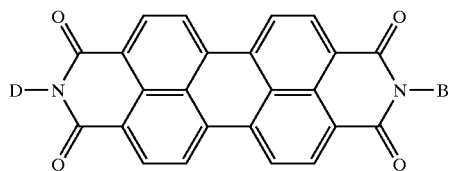

(IIa),

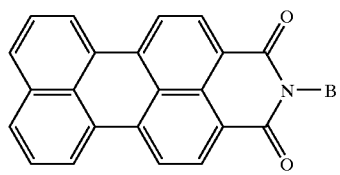

(IIb), in which D is $C_1$–$C_6$alkyl, unsubstituted or halo- or $C_1$–$C_6$alkyl-substituted phenyl, benzyl or phenethyl or B, where B is identical to that described above.

b) Quinacridones of the following formula (III):

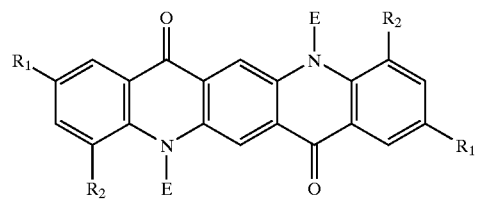

(III), in which $R_1$ and $R_2$ independently of one another are hydrogen, halogen, $C_1$–$C_{24}$alkyl, $C_1$–$C_6$alkoxy or phenyl, and E is hydrogen or a group of the following formula:

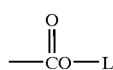

in which L is any suitable solubilizing group, with the proviso that at least one of the groups E is a group other than hydrogen.

c) Dioxazines of the following formulae:

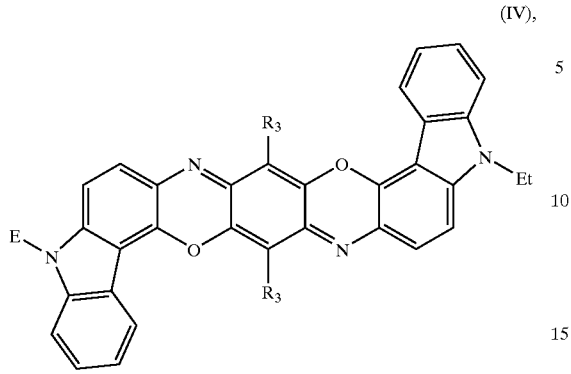
(IV), in which $R_3$ is hydrogen, halogen or $C_1$–$C_{24}$alkyl, and E is identical to that described above,

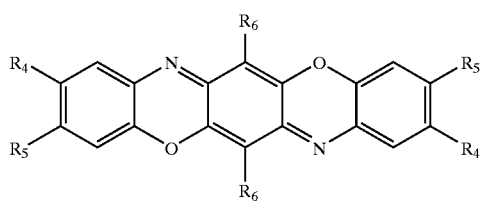
(IVa), in which $R_4$, $R_5$ and $R_6$ independently of one another are hydrogen, $C_1$–$C_4$alkyl, $C_1$–$C_4$alkoxy, NECO—$C_1$–$C_4$alkyl, NECO-phenyl or $N(E)_2$, where at least one of $R_4$, $R_5$ and $R_6$ is NECO—$C_1$–$C_4$alkyl, NECO-phenyl or $N(E)_2$, and E is identical to that described above.

d) Isoindolines of the following formulae:

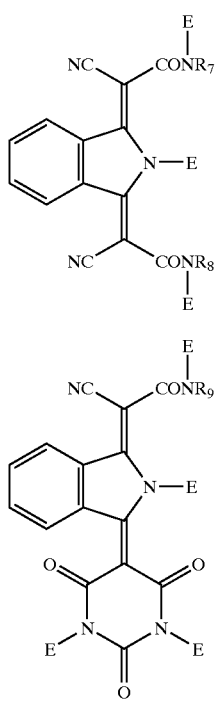
(V), (VI),

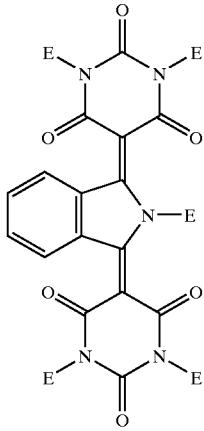
(VII), in which $R_7$ is a group:

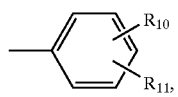

$R_8$ is hydrogen, $C_1$–$C_{24}$alkyl, benzyl or a group:

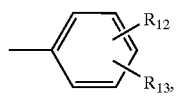

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, and E is identical to that described above.

e) Isoindolinones of the following formulae:

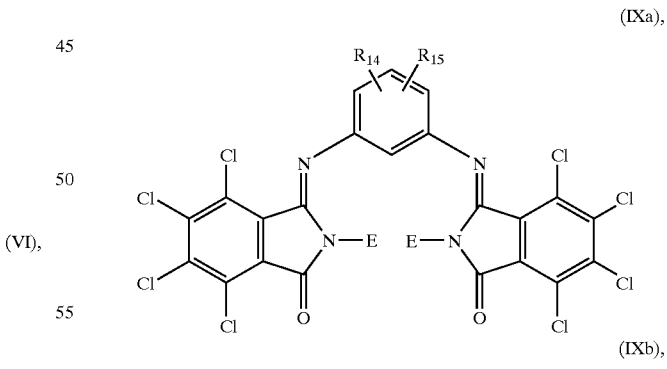
(IXa),

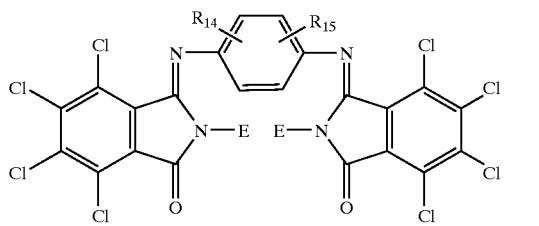
(IXb), in which $R_{14}$ and $R_{15}$ independently of one another are hydrogen, halogen or $C_1$–$C_4$alkyl, and E is identical to that described above.

f) Anthraquinoid compounds of the following formulae:

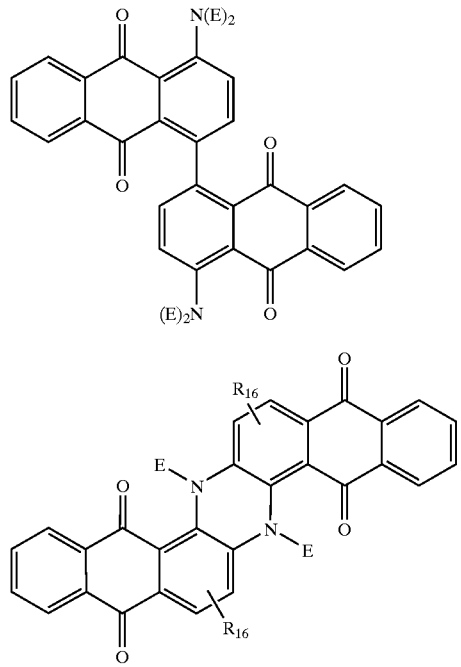

in which $R_{16}$'s independently of one another are hydrogen or halogen, and E is identical to that described above.

g) Phthalocyanine of the following formula:

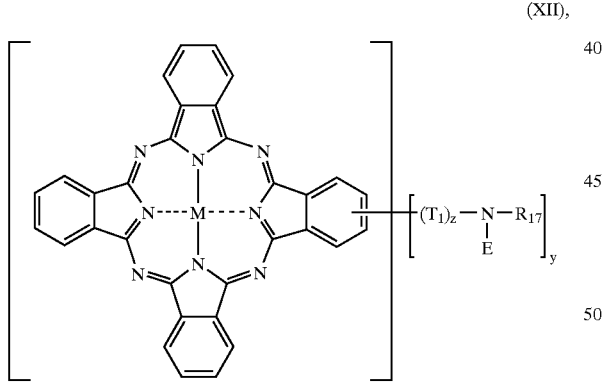

in which M is $H_2$, a divalent metal selected from the group consisting of Cu (II), Zn (II), Fe (II), Ni (II), Ru (II), Rh (II), Pd (II), Pt (II), Mn (II), Mg (II), Be (II), Ca (II), Ba (II), Cd (II), Hg (II), Sn (II), Co (II) and Pb (II), (preferably a divalent metal selected from the group consisting of Cu (II), Zn (II), Fe (II), Ni (II) and Pd (II)), or a divalent metal oxide selected from the group consisting of V(O), Mn(O) and TiO;

$T_1$ is —$CHR_{18}$—, —CO— or $SO_2$—;

$R_{17}$ is hydrogen, $C_1$–$C_6$alkyl, —$N(E)R_{18}$, $N(E)_2$, —$NECOR_{19}$, —$COR_{19}$ or a group;

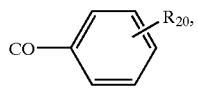

$R_{18}$ is hydrogen or $C_1$–$C_6$alkyl;

$R_{19}$ is $C_1$–$C_6$alkyl;

$R_{20}$ is hydrogen, halogen, $C_1$–$C_6$alkyl or $C_1$–$C_6$alkoxy;

Z is zero or 1;

y is an integer of 1 to 8, and E is identical to that described above.

h) Pyrrolo[3,4-c]pyrroles of the following formulae:

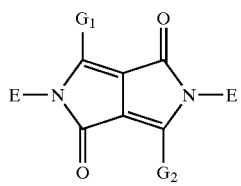

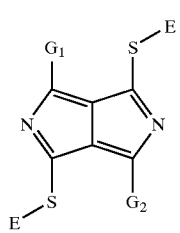

in which $G_1$ and $G_2$ independently of one another are any of the following groups, and E is identical to that described above.

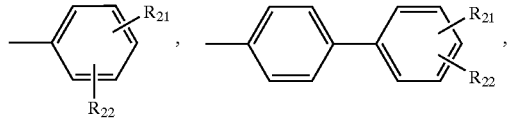

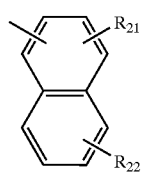 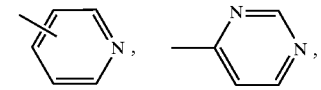

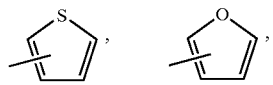 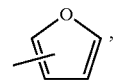

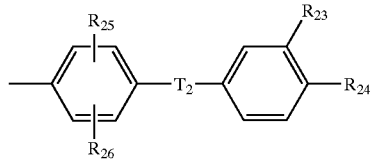

in which $R_{21}$ and $R_{22}$ independently of one another are hydrogen, halogen, $C_1$–$C_{24}$alkyl, $C_1$–$C_6$alkoxy, $C_1$–$C_{18}$alkylmercapto, $C_1$–$C_{18}$alkylamino, —CN, —NO$_2$, phenyl, trifluoromethyl, $C_5$–$C_6$cycloalkyl, —C=N—($C_1$–$C_{24}$alkyl), a group;

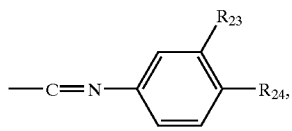

imidazolyl, pyrazolyl, triazolyl, piperadinyl, pyrrolyl, oxazolyl, benzoxazolyl, benzothiazolyl, benzoimidazolyl, morpholinyl, piperidinyl or pyrrolidinyl;

$T_2$ is —CH$_2$—, —CH(CH$_3$)—, —CH(CH$_3$)$_2$—, —CH=N—, —N=N—, —O—, —S—, —SO—, —SO$_2$— or —NR$_{27}$;

$R_{23}$ and $R_{24}$ independently of one another are hydrogen, halogen, $C_1$–$C_6$alkyl, $C_1$–$C_6$alkoxy or —CN;

$R_{25}$ and $R_{26}$ independently of one another are hydrogen, halogen or $C_1$–$C_6$alkyl;

$R_{27}$ is hydrogen or $C_1$–$C_6$alkyl.

i) Quinophthalones of the following formulae:

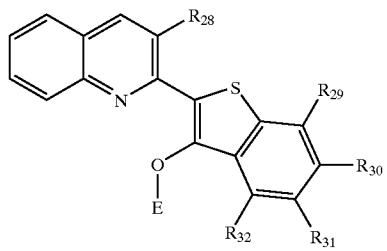

(XIVa),

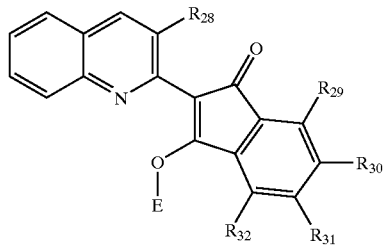

(XIVb), in which $R_{28}$ is hydrogen or O—E;

$R_{29}$, $R_{30}$, $R_{31}$, and $R_{32}$ independently of one another are hydrogen, halogen, —COO—$C_1$–$C_6$alkyl or —CONE—$C_1$–$C_6$alkyl; and E is identical to that described above.

j) Azo compounds of the following formulae:

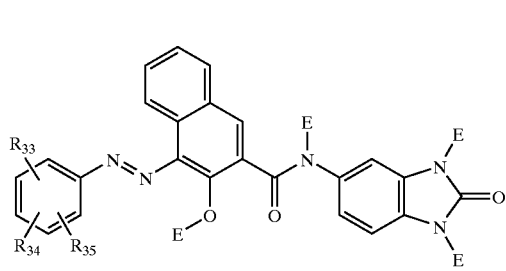

(XVa),

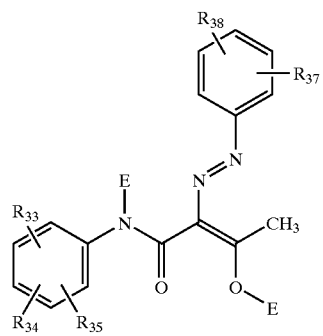

(XVb),

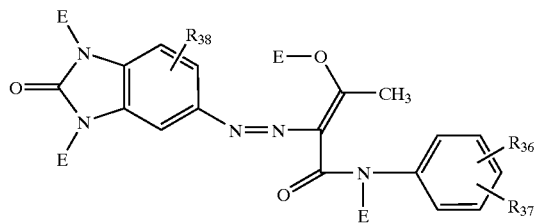

(XVc),

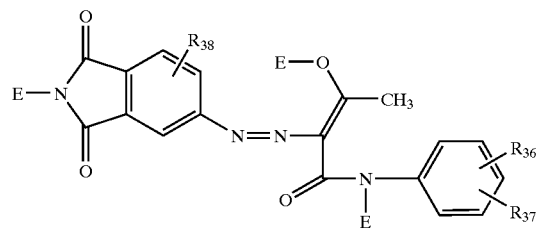

(XVd),

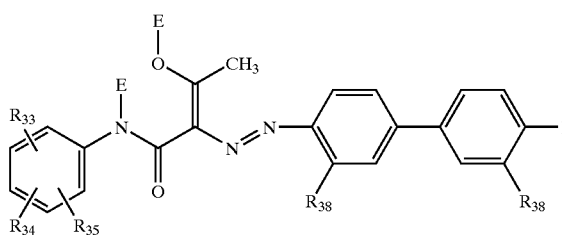

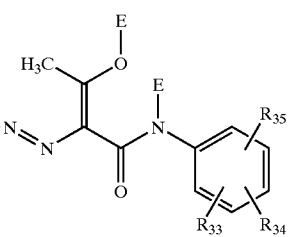

(XVe),

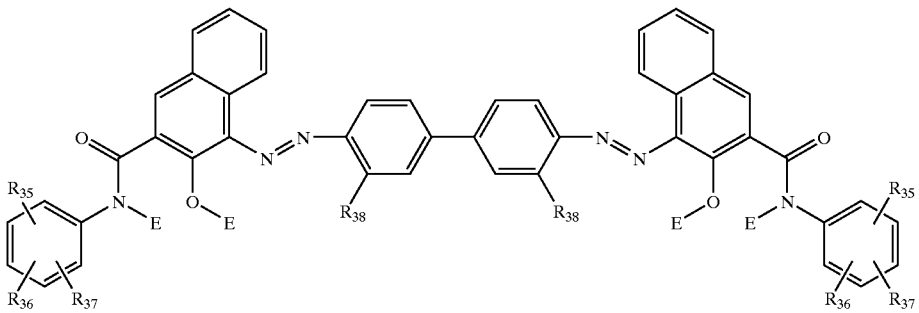

(XVf), in which $R_{33}$, $R_{34}$, $R_{35}$, $R_{36}$ and $R_{37}$ independently of one another are hydrogen, halogen, $C_1$–$C_6$alkyl, $C_1$–$C_6$alkoxy, $NO_2$, acetyl or —$SO_2NE$—$C_1$–$C_6$alkyl; $R_{38}$ is hydrogen, halogen, $C_1$–$C_6$alkyl or $C_1$–$C_6$alkoxy; and E is identical to that described above.

k) Anthraquinones of the following formulae:

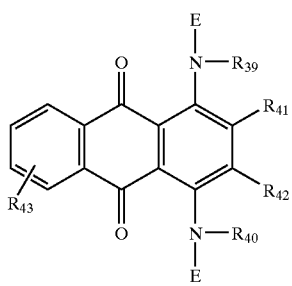

(XVIa),

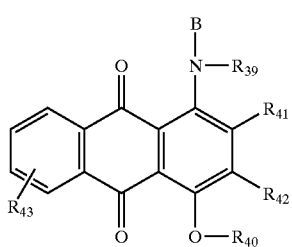

(XVIb), in which $R_{39}$ and $R_{40}$ independently of one another are hydrogen, $C_1$–$C_{12}$alkyl or $C_6$–$C_{12}$aryl which is unsubstituted or substituted by halogen, $C_1$–$C_6$alkyl, $C_1$–$C_6$alkoxy, $NO_2$, acetyl, $SO_2NE$—$C_1$–$C_6$alkyl or —$SO_2NE_2$;

$R_{41}$ and $R_{42}$ independently of one another are hydrogen, halogen, $C_1$–$C_6$alkyl, $C_1$–$C_6$alkoxy, $NO_2$, cyano, $CONE_2$, $SO_2NE$—$C_1$–$C_6$alkyl or $SO_2NE_2$, $SO_3E$, $SO_3Na$ or $C_6$–$C_{12}$aryl which is unsubstituted or substituted by halogen, $C_1$–$C_6$alkyl, $C_1$–$C_6$alkoxy, $NO_2$, acetyl, $SO_2NE$—$C_1$–$C_6$alkyl or $SO_2NE_2$;

$R_{43}$ is hydrogen, halogen, $NO_2$, cyano, hydroxyl or $C_1$–$C_6$alkoxy; and B and E are identical to that described above.

l) Indigo derivatives of the following formula:

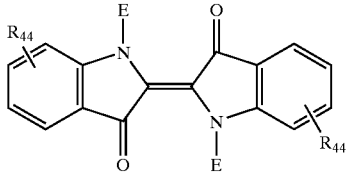

(VIII), in which $R_{44}$ is hydrogen, halogen, CN, $C_1$–$C_6$alkyl or $C_1$–$C_6$alkoxy, and E is identical to that described above.

To describe in further details, preferred quinacridones are those, wherein in Formula (III) $R_1$ and $R_2$ independently of one another are hydrogen, chlorine or methyl.

Preferred pyrrolo[3,4-c]pyrroles are those, wherein in Formula XIII $G_1$ and $G_2$ are identical and are a group of the following formulae:

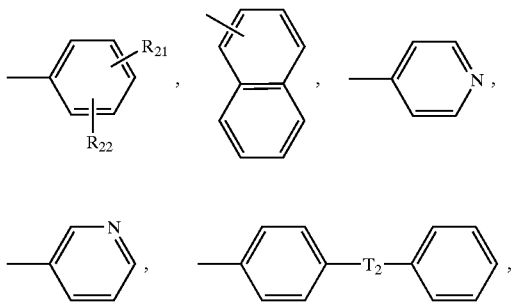

wherein $R_{21}$ and $R_{22}$ independently of one another are hydrogen, chlorine, bromine, $C_1$–$C_4$alkyl, $C_1$–$C_6$alkoxy, $C_1$–$C_{16}$alkylamino, —CN or phenyl;

$T_2$ is —N=N—, —O—, —$SO_2$— or —$NR_{27}$; and $R_{27}$ is hydrogen, methyl or ethyl.

Preferred azo compounds are those, wherein in Formulae (XVa) to (XVf) $R_{33}$, $R_{34}$, $R_{35}$, $R_{36}$ and $R_{37}$ independently of one another are hydrogen, halogen, methyl, methoxy, $NO_2$, acetyl or $SO_2NECH_3$ and $R_{38}$ is halogen or methoxy.

In the present invention, particularly preferred is any one of the quinacridones of the following formulae:

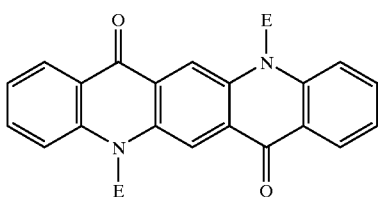
(XVII),

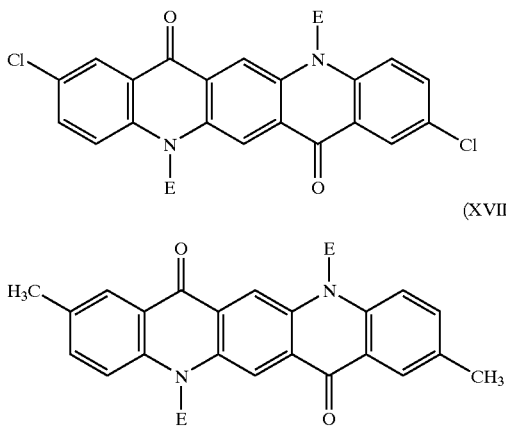
(XVIIIa),
(XVIIIb), wherein E is identical to that described above.

In the present invention, particularly preferred dioxazines are those of the following formula:

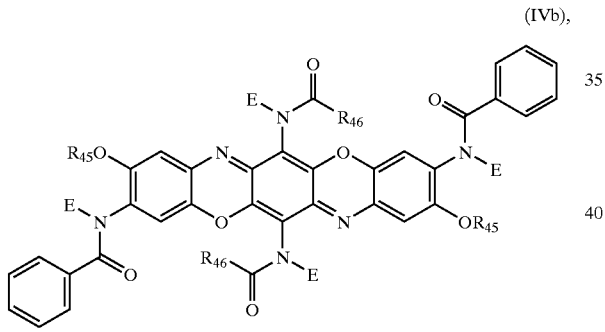
(IVb), in which $R_{45}$ and $R_{46}$ independently of one another are $C_1$–$C_4$alkyl, and E is identical to that described above.

In the present invention, particularly preferred pyrrolopyrroles are those of the following formula:

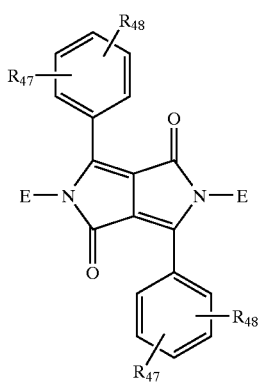
(XIX), in which $R_{47}$ and $R_{48}$ independently of one another are hydrogen, methyl, tert-butyl, chlorine, bromine, cyano or phenyl, and E is identical to that described above.

In the present invention, particularly preferred phthalocyanines are those of the Formula (XII) in which M is Cu (II) and $R_{16}$ is hydrogen or E, and z is 1 and y is 1 to 4 (E is identical to that described above).

In the present invention, particularly preferred isoindolines are those of the following formula:

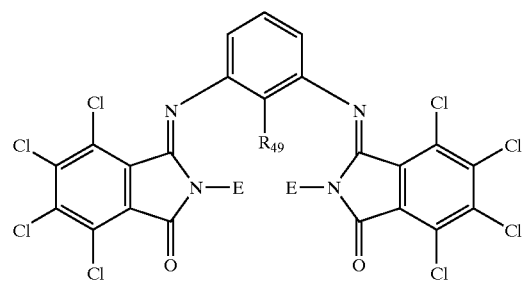
(XX), in which $R_{49}$ is $C_1$–$C_4$alkyl, and E is identical to that described above.

In the present invention, particularly preferable indanthrones are those of the following formula:

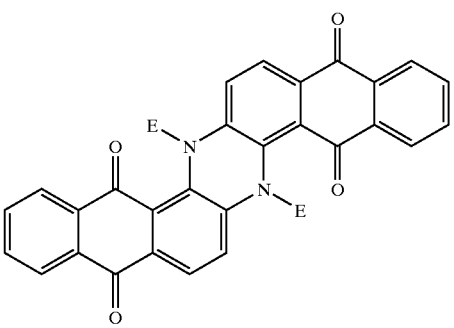
(XXI), in which E is identical to that described above.

In the present invention, particularly preferable azo compounds are those, wherein in Formula (XVa), (XVb), (XVe) or (XVf) described above, $R_{33}$, $R_{34}$, $R_{35}$, $R_{36}$ and $R_{37}$ independently of one another are hydrogen, chlorine, methoxy, $NO_2$, acetyl or $SO_2NECH_3$, and $R_{38}$ is halogen or methoxy (where E is identical to that described above).

In the present invention, particularly noteworthy soluble chromophores are those which can be prepared from, for example, the following C. I. Pigment Yellow 73, Pigment Yellow 74, Pigment Yellow 83, Pigment Yellow 109, Pigment Yellow 139, Pigment Orange 71, Pigment Orange 73, Pigment Red 122, Pigment Red 185, Pigment Red 202, Pigment Red 254, Pigment Red 255, Pigment Red 264, Pigment Blue 25, Pigment Blue 26, Pigment Blue 60, Pigment Blue 64, Pigment Violet 19, Pigment Violet 29 and Pigment Violet 37.

The compounds of Formulas (I) to (XXI) and the production processes thereof have already been publicly known and are disclosed in, for example, EP648770, EP648817 and EP742556.

In accordance with the present invention, the preferred groups of the solubilizing group —L in Formula (I) shall be shown below:

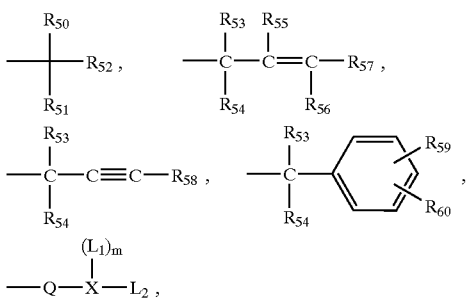

in which $R_{50}$, $R_{51}$ and $R_{52}$ independently of one another are $C_1$–$C_6$alkyl;

$R_{53}$ and $R_{54}$ independently of one another are $C_1$–$C_6$alkyl, O, S or $N(R_{61})_2$-interrupted $C_1$–$C_6$alkyl, unsubstituted or halo-, $C_1$–$C_6$alkyl-, $C_1$–$C_6$alkoxy-, $NO_2$— or cyano-substituted phenyl or biphenylyl;

$R_{55}$, $R_{56}$ and $R_{57}$ independently of one another are hydrogen or $C_1$–$C_6$alkyl;

$R_{58}$ is hydrogen, $C_1$–$C_6$alkyl or any of the following groups:

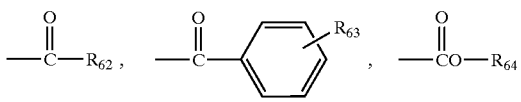

$R_{59}$ and $R_{60}$ independently of one another are hydrogen, halogen, $C_1$–$C_6$alkyl, $C_1$–$C_6$alkoxy, cyano, $NO_2$, $N(R_{61})_2$, unsubstituted or halo-, $C_1$–$C_6$alkyl-, $C_1$–$C_6$alkoxy-, $NO_2$— or cyano-substituted phenyl;

$R_{61}$ and $R_{62}$ are $C_1$–$C_6$alkyl;

$R_{63}$ is hydrogen or $C_1$–$C_6$alkyl;

$R_{64}$ is hydrogen, $C_1$–$C_6$alkyl, unsubstituted or $C_1$–$C_6$alkyl-substituted phenyl;

Q is p,q-$C_2$–$C_6$alkylene which is unsubstituted or substituted once or more times by $C_1$–$C_6$alkoxy, $C_1$–$C_6$alkylmercapto or $C_2$–$C_{12}$dialkylamino (where p and q are different numeric locants);

X is a heteroatom selected from the group consisting of N, O and S, where m is 0 if X is O or S and is 1 if X is N;

$L_1$ and $L_2$ independently of one another are unsubutituted or mono- or poly-$C_1$–$C_{12}$alkoxy, —$C_1$–$C_{12}$alkylmercapto, —$C_2$–$C_{24}$dialkylamino, —$C_6$–$C_{12}$aryloxy, —$C_6$–$C_{12}$arylmercapto, —$C_7$–$C_{24}$alkylarylamino or —$C_{12}$–$C_{24}$diarylamino-substituted $C_1$–$C_6$alkyl, or [-(p',q'-$C_2$–$C_6$alkylene)-Z—]$_n$—$C_1$–$C_6$alkyl (where n is a number of 1 to 1000; p' and q' are different numeric locants; each Z independently of the others is a heteroatom comprising oxygen, sulfur or $C_1$–$C_{12}$alkyl-substituted nitrogen; and all $C_2$–$C_6$alkylenes in the repeating units [—$C_2$–$C_6$alkylene-Z—] can be identical or different);

$L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group halogen, cyano and $NO_2$.

Preferable are compounds of Formula (I) in which L is $C_1$–$C_6$alkyl or a group:

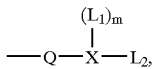

in which Q is $C_2$–$C_4$alkylene, and $L_1$ and $L_2$ are [—$C_2$–$C_{12}$alkylene-Z—]$_n$—$C_1$–$C_{12}$alkyl or $C_1$–$C_{12}$alkyl which is substituted once or more times by $C_1$–$C_{12}$alkoxy, $C_1$–$C_{12}$alkylmercapto or $C_2$–$C_{24}$dialkylamino (m and n are as defined above).

Further preferable are compounds of Formula (I) in which L is $C_4$–$C_5$alkyl or the group of the following formula:

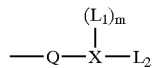

in which Q is $C_2$–$C_4$alkylene, X is oxygen (in this case, m is 0), and $L_2$ is [—$C_2$–$C_{12}$alkylene-O—]$_n$—$C_1$–$C_{12}$alkyl or $C_1$–$C_{12}$alkyl which is substituted once or more times by $C_1$–$C_{12}$alkoxy, especially those in which —Q—X— is —$C(CH_3)_2$—$CH_2$—O—.

Further more preferable pigment precursors of the present invention are compounds of Formula (I) in which the group L is tert-butyl or tert-amyl.

Alkyl and alkylene can be straight-chain, branched, monocyclic and polycyclic.

Specific examples of $C_1$–$C_{12}$alkyl include methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl and dodecyl.

Further, if $C_2$–$C_{12}$alkyl is an unsaturated compound having two or more double bonds such as $C_2$–$C_{12}$alkenyl, $C_2$–$C_{12}$alkynyl, $C_2$–$C_{12}$alkapolyenyl and $C_2$–$C_{12}$alkapolyinyl, specific examples of this $C_1$–$C_{12}$alkyl are vinyl, allyl, 2-propene-yl, 2-butene-1-yl, 3-butene-1-yl, 1,3-butadiene-2-yl, 2-cyclobutene-1-yl, 2-pentene-1-yl, 3-pentene-2-yl, 2-methyl-1-butene-3-yl, 2-methyl-3-butene-2-yl, 3-methyl-2-butene-1-yl, 1,4-pentadiene-3-yl, 2-cyclopentene-1-yl, 2-cyclohexene-1-yl, 3-cyclohexene-1-yl, 2,4-cyclohexadiene-1-yl, 1-p-menthene-8-yl, 4(10)-thujen-10-yl, 2-norbornene-1-yl, 2,5-norbornadiene-1-yl, 7,7-dimethyl-2,4-norcaradiene, and various isomers such as hexynyl, octenyl, nonenyl, decenyl and dodecenyl.

Specific examples of $C_2$–$C_4$alkylene are 1,2-ethylene, 1,2-propylene, 1,3-propylene, 1,2-butylene, 1,3-butylene, 2,3-butylene, 1,4-butylene and 2-methyl-1,2-propylene.

Specific examples of $C_5$–$C_{12}$alkylene are various isomers of pentylene, hexylene, octylene, decylene and dodecylene.

$C_1$–$C_{12}$alkoxy is O—$C_1$–$C_{12}$alkyl, preferably O—$C_1$–$C_4$alkyl.

$C_6$–$C_{12}$ aryloxy is O—$C_6$–$C_{12}$aryl, and specific examples thereof are phenoxy or naphthoxy, preferably phenoxy.

$C_6$–$C_{12}$ arylmercapto is S—$C_1$–$C_{12}$aryl, and specific examples thereof are phenylmercapto and naphthylmercapto, preferably phenylmercapto.

$C_2$–$C_{24}$dialkylamino is $N(alkyl_1)(alkyl_2)$, where the sum of the carbon atoms in the two groups $alkyl_1$ and $alkyl_2$ is from 2 to 24, preferably $N(C_1$–$C_4alkyl)$-$C_1$–$C_4$alkyl.

$C_7$–$C_{24}$alkylarylamino is $N(alkyl_1)(aryl_2)$, where the sum of the carbon atoms in the two groups $alkyl_1$ and $aryl_2$ is from 7 to 24, for example methylphenylamino, ethylnaphthylamino or butylphenanthrylamino, preferably methylphenylamino or ethylphenylamino.

$C_{12}$–$C_{24}$diarylamino is $N(aryl_1)(aryl_2)$, where the sum of the carbon atoms in the two groups $aryl_1$ and $aryl_2$ is from 12 to 24, for example diphenylamino or phenylnaphthylamino, preferably diphenylamino.

Halogen is chlorine, bromine, fluorine or iodine, preferably fluorine or chlorine.

n is preferably a number from 1 to 100, with particular preference a number from 2 to 12.

Used as the organic solvent of the present invention are all of aliphatic hydrocarbons, aromatic hydrocarbons, alcohols, amides, nitrites, nitro compounds, N-heterocyclic compounds, ethers, ketones and esters as long as they are publicly known and available in the market and can dissolve the compounds of Formula (I) described above. Water can be used as well if appropiate. These solvents have preferably a boiling point of 40 to 300° C.

To describe the solubility, the solvents which can dissolve the compound (I) in a proportion of 5% by weight or more, preferably 10% by weight or more are preferred in terms of a density in drawn lines of the lead. Specific examples thereof are methanol, ethanol, isopropanol, n-butanol, benzyl alcohol, diethyl ether, 1-acetoxy-2-ethoxyethanol, acetone, methyl ethyl ketone, cyclopentanone, butyrolactone, 1-methoxy-2-propanol, 1,2-dimethoxyethane, 1,2-diethoxyethane, 2-methoxyethanol, 2-methoxy-propyl acetate, ethyl acetate, butyl acetate, isopropyl laurate, methyl methacrylate, tetrahydrofuran, dioxane, acetonitrile, benzonitrile, nitrobenzene, N,N-dimethylformamide, N,N-dimethylacetamide, dimethylsulfoxide, N-methylpyrrolidone, pyridine, picoline, quinoline, dichloromethane, chloroform, methylcyclohexane, benzene, toluene, xylene, diisopropylnaphthalene, anisole and chlorobenzene. It is a matter of course that these solvents can be used in a mixture thereof.

In the present invention, a method for filling a porous sintered lead with a solution of the compound which is the pigment precursor of Formula (I) described above comprises dipping the porous sintered lead into the solution described above to fill the pores thereof with the solution, if necessary, under conditions of heating and applying pressure or reducing pressure.

Then, the organic solvent is removed by drying, and the lead is heated at a temperature of 100 to 250° C., preferably 150 to 200° C. and particularly preferably 160 to 200° C. which is optimum to the respective pigment precursors to convert the compound of Formula (I) described above into an organic pigment.

A catalyst such as, for example, an acid can be used if appropiate in order to lower the pigmenting temperature.

Heating time for pigmenting is different according to the heating temperature, a size and a shape of the lead pores and other conditions, and therefore it can not generally be defined. It is approximately several seconds to several hours, preferably 1 to 30 minutes.

Further, dipping and heating may be repeated in order to increase a density in the drawn lines.

The compounds which are the pigment precursors of Formula (I) can be mixed and dissolved in a solvent and heated to obtain an optional mixed color.

The lead obtained after the compound of Formula (I) described above is converted into a pigment can be impregnated, if necessary, with a lubricant such as oil, a UV absorber, a light stabilizer and an antistatic agent for the purpose of elevating stability with the passage of time and a writing feeling.

In the process for producing a sintered color pencil lead of the present invention thus constituted, the following effects (1) to (3) are provided.

(1) The compound of Formula (I) described above can be dissolved in an organic solvent in a high concentration, and a solution thereof has a low viscosity, so that a lead having such a small pore diameter as in the present invention can be impregnated with said solution equally to or more than a dye ink. Accordingly, the pores of the lead can readily be filled with the pigment in an amount sufficient for obtaining a high density in the drawn lines. Further, it is a solution of an organic solvent, and therefore it does not deteriorate the lead comprising ceramics, clay and the like.

(2) A plurality of the compounds of Formula (I) described above can be blended in an optional proportion and dissolved in a specific organic solvent, and multicoloring of the lead can easily be achieved. Further, the organic pigment obtained after heating the compound described above is stable with the passage of time, and therefore the sintered color pencil lead which has a vivid coloring property and a sufficiently high density in the drawn lines and which is excellent in stability with the passage of time such as light fastness can be obtained according to the present invention.

(3) The colorant for the sintered color pencil lead of the present invention is a solid pigment at the final stage and is not adhered onto a paper face unlike the conventional dye inks, and therefore the color pencil lead having an excellent erasability with an eraser is obtained.

EXAMPLES

Next, the present invention shall more specifically be explained with reference to examples and comparative examples, but the present invention shall by no means be restricted by the following examples.

Example 1

| | |
|---|---|
| Boron nitride | 40% by weight |
| Vinyl chloride resin | 43% by weight |
| Dioctyl phthalate (DOP) | 16% by weight |
| Oleic amide | 1% by weight |

The blend composition described above was mixed and dispersed by means of a Henschel mixer and kneaded by means of a pressure kneader and a two roll mill. Then, it was extruded into fine lines, and they were subjected to heat treatment at 180° C. for 10 hours in the air in order to remove the residual plasticizer and then heated up to 1000° C. in a nitrogen atmosphere, followed by sintering at 1000° C. for one hour, whereby a first sintered lead was obtained.

This first sintered lead was sintered by heating at 700° C. in the air to remove carbons, whereby a white second sintered lead was obtained.

This second sintered lead 100 g was dipped into a vessel containing 140 g of a xylene solution (20% by weight) of perhydropolysilazane and then heated up to 1200° C. in a nitrogen atmosphere, followed by sintering at 1200° C. for one hour, whereby a white third sintered lead having a diameter of 0.57 mm was obtained.

Next, the third sintered lead described above was dipped into an ethyl acetate solution (20% by weight) of a pigment precursor No. 1 shown in the following Table 1 and left standing at room temperature for 24 hours.

The lead was taken out of the solution and then heated at 180° C. for 20 minutes to obtain a yellow sintered pencil lead having a diameter of 0.57 mm.

Example 2

A toluene solution (15% by weight) of a pigment precursor No. 2 shown in the following Table 1 was used to dip thereinto the third sintered lead in the same manner as in Example 1, and the lead was left standing at room temperature for 24 hours. The lead was taken out of the solution and then heated at 180° C. for 20 minutes to obtain a red sintered pencil lead having a diameter of 0.57 mm.

Example 3

A cyclopentanone solution (15% by weight) of a pigment precursor No. 3 shown in the following Table 1 was used to dip thereinto the third sintered lead in the same manner as in Example 1, and the lead was left standing at room temperature for 24 hours. The lead was taken out of the solution and then heated at 180° C. for 20 minutes to obtain a reddish purple sintered pencil lead having a diameter of 0.57 mm.

Example 4

A tetrahydrofuran solution (15% by weight) of a pigment precursor No. 4 shown in the following Table 1 was used to dip thereinto the third sintered lead in the same manner as in Example 1, and the lead was left standing at room temperature for 24 hours. The lead was taken out of the solution and then heated at 180° C. for 20 minutes to obtain a light blue sintered pencil lead having a diameter of 0.57 mm.

Example 5

100 g of the same second sintered lead as in Example 1 was dipped into a vessel containing 140 g of a xylene solution (20% by weight) of perhydropolysilazane and then heated up to 1200° C. in the air, followed by sintering at 1200° C. for one hour, whereby a third sintered lead having a diameter of 0.57 mm was obtained.

Next, the third sintered lead described above was dipped into a toluene solution (20% by weight) of the pigment precursor No. 1 shown in the following Table 1 and left standing at room temperature for 24 hours. The lead was taken out of the solution and then heated at 180° C. for 20 minutes to obtain a yellow sintered pencil lead having a diameter of 0.57 mm.

Example 6

Blend Composition A

| | |
|---|---|
| Zirconium acetylacetonate.ethyl acetoacetate | 30.00% by weight |
| Water | 1.75% by weight |
| Hydrochloric acid (36%) | 0.45% by weight |
| n-Butyl alcohol | 44.30% by weight |

The blend composition A described above was heated at 35° C. for one hour.

Blend Composition B

| | |
|---|---|
| Boron nitride | 13.00% by weight |
| Polyvinylbutyral | 6.60% by weight |
| Tetraethylene glycol | 3.90% by weight |

The blend composition A which finished refluxing was added to the blend composition B described above, and they were mixed and dispersed by means of a mixer and kneaded by means of a two roll mill to adjust the amount of the solvent. Then, it was extruded into fine lines, and they were dried at 200° C. in the air in order to remove the residual solvent and plasticizer and then heated up to 1700° C. in an argon atmosphere, followed by being sintered at 1700° C. for one hour. Further, they were heated up to 700° C. in the air and sintered at 700° C. for 3 hours to obtain a white sintered lead having a diameter of 0.57 mm.

Next, the sintered lead described above was dipped into a tetrahydrofuran solution (20% by weight) of the pigment precursor No. 3 shown in the following Table 1, and the lead was left standing at room temperature for 24 hours. The lead was taken out of the solution and then heated at 180° C. for 20 minutes to obtain a reddish purple sintered pencil lead having a diameter of 0.57 mm.

Example 7

| | |
|---|---|
| Boron nitride | 40% by weight |
| Kaolin | 35% by weight |
| Polyvinyl alcohol | 18% by weight |
| Polyethylene glycol | 7% by weight |

The blend composition described above was mixed with the same amount of water and dispersed by means of a Henschel mixer and kneaded by means of a two roll mill to adjust the water content. Then, it was extruded into fine lines, and they were subjected to heat treatment at 105° C. for 15 hours in the air in order to remove the residual water. Then, they were heated up to 1100° C. in argon gas and sintered at 1100° C. for one hour. Further, they were heated and sintered at 700° C. in the air to remove carbons, whereby a white sintered pencil lead having a diameter of 0.57 mm was obtained.

Next, the sintered lead described above was dipped into a toluene solution (15% by weight) of the pigment precursor No. 2 shown in the following Table 1, and the lead was left standing at room temperature for 24 hours. The lead was taken out of the solution and then heated at 180° C. for 20 minutes to obtain a red sintered pencil lead having a diameter of 0.57 mm.

TABLE 1

No. 1

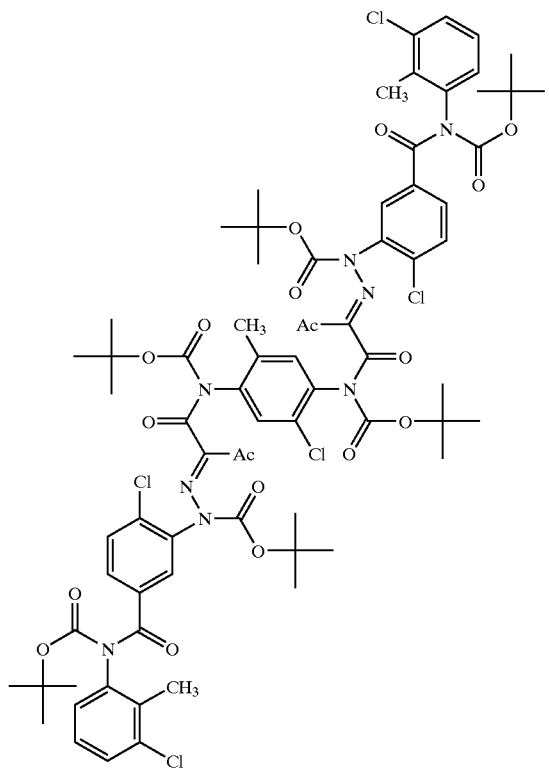

No. 2

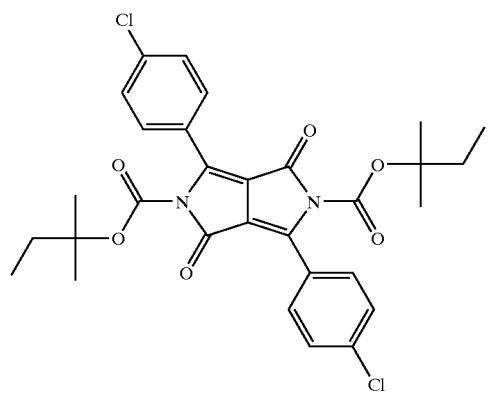

TABLE 1-continued

No. 3

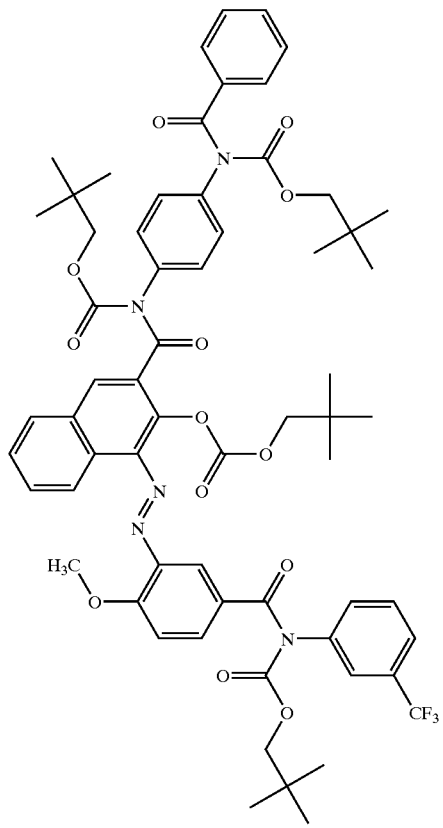

No. 4

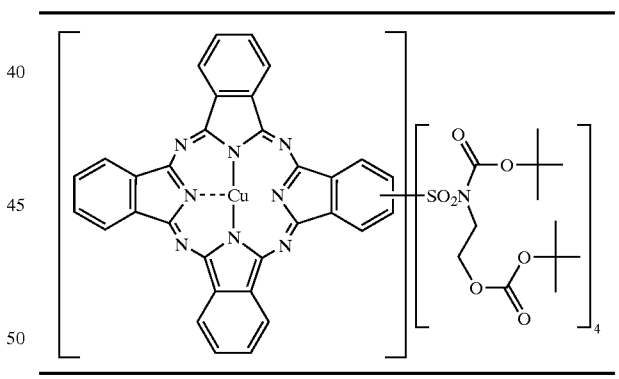

Comparative Example 1

The same sintered lead (third sintered lead) as in Example 1 was dipped into a pigment solution obtained by dissolving 14% by weight of C. I. Pigment Blue 15: 3 (copper phthalocyanine pigment) in 86% by weight of 98% sulfuric acid for 24 hours, and then it was dipped into water for 12 hours, neutralized, washed with water and rinsed to obtain a light blue sintered pencil lead having a diameter of 0.57 mm.

Comparative Example 2

The same sintered lead (third sintered lead) as in Example 1 was dipped into a red solution comprising:

| | |
|---|---|
| Spilon Red C-GH (manufactured by Hodogaya Chemical Co., Ltd.) | 20% by weight |
| Ethyl alcohol | 55% by weight |
| Polyoxyethylene lauryl ether | 25% by weight |

(n=4.5)
and left standing at room temperature for 24 hours. The lead was taken out of the solution and then dried at 80° C. for 5 hours to remove ethyl alcohol, whereby a red sintered color pencil lead having a diameter of 0.57 mm was obtained.

Measured and evaluated according to the following evaluating methods were a bending strength, a pore diameter, a light fastness and an erasability of the sintered color pencil leads prepared in Examples 1 to 7 and Comparative Examples 1 to 2.

The results thereof are shown in the following Table 2.

(1) Measuring Method for Bending Strength

A bending strength of the lead before and after coloring was measured based on JIS-S-6005.

(2) Measuring Method for Pore Diameter

The median pore diameter was measured by means of a mercury porosimeter.

(3) Evaluating Method for Light Fastness

The light fastness was determined by drawing lines on wood free paper and then irradiating them with a xenon lamp for 6 hours to measure a difference ($\Delta L^*$) in a lightness index $L^*$ of the drawn lines before and after irradiation. It is shown that the smaller the $\Delta L^*$ is, the better the light fastness.

(4) Evaluating Method for Erasability

The erasability was determined according to the following equation:

$$\text{erasability (\%)} = (\text{drawn line density} - \text{density after erasing drawn lines})/(\text{drawn line density}) \times 100$$

The drawn line density was measured based on JIS-S-6005.

TABLE 2

| | Bending strength MPa Before coloring | Bending strength MPa After coloring | Median pore diameter μm | Erasability % | Light fastness $\Delta L^*$ |
|---|---|---|---|---|---|
| Example 1 | 250.5 | 249.8 | 0.18 | 100.0 | 0.4 |
| Example 2 | 250.5 | 252.1 | 0.18 | 99.8 | 0.3 |
| Example 3 | 250.5 | 250.9 | 0.18 | 99.2 | 0.3 |
| Example 4 | 250.5 | 253.0 | 0.18 | 100.0 | 0.3 |
| Example 5 | 239.7 | 241.2 | 0.15 | 100.0 | 0.4 |
| Example 6 | 209.9 | 210.1 | 0.17 | 99.2 | 0.3 |
| Example 7 | 117.0 | 115.8 | 0.23 | 97.6 | 0.3 |
| Comparative Example 1 | 250.5 | 203.4 | 0.18 | 100.0 | 0.6 |
| Comparative Example 2 | 250.5 | 249.8 | 0.18 | 96.0 | 12.6 |

Comments on Results Summarized in Table 2

As apparent from the results shown in Table 2 described above, it has been found that the sintered leads prepared in Examples 1 to 7 falling in the scope of the present invention have a good erasability and are excellent in light fastness. However, the lead prepared in Example 7 in which clay was used as a binder has a bending strength which is not so high, and the leads prepared in Examples 1 to 6 have a sufficiently satisfactory value in terms of practical use.

In contrast with this, it has been found that the sintered lead prepared in Comparative Example 1 is a little reduced in strength because of dipping in a conc. sulfuric acid solution and that the sintered lead prepared in Comparative Example 2 is inferior in light fastness because the colorant was a dye.

Industrial Applicability

According to the present invention, provided is a process for producing a sintered color pencil lead which can draw lines having excellent light fastness and weatherability while having a vivid coloring property and a sufficiently high density in drawn lines and is excellent in a mechanical strength such as a bending strength and which can readily be erased with an eraser and is particularly suited as a fine size color pencil lead for a mechanical pencil.

What is claimed is:

1. A process for producing a sintered color pencil lead characterized by forming a white or light-colored porous sintered pencil lead that is pigmented with an organic pigment by treating said porous sintered pencil lead with a solution of at least one compound of the following Formula (I) to be filled with said compound and then by forming said organic pigment within the pores by means of heating, $$A(B)x \tag{I}$$

in which x is an integer from 1 to 8,

A is the radical of a chromophore of the quinacridone, anthraquinone, perylene, indigo, quinophthalone, indanthrone, isoindolinone, isoindoline, dioxazine, azo series, phthalocyanine or diketopyrrolopyrrole which is attached to x groups B via one or more heteroatoms selected from the group consisting of N, O and S and forming part of the radical A, B is hydrogen or a group of the formula $$-\underset{\underset{\text{O}}{\|}}{\text{C}}-\text{L}$$

where at least one group B is not hydrogen and, if x is 2 to 8, all the groups B can be identical or different, and L is any suitable solubilizing group.

2. The process for producing a sintered color pencil lead according to claim 1 in which the compound of Formula (I) is selected from compounds of the following Formulae (IIa) to (XVIb):

a) perylencarboximides of the following formulae (IIa),

-continued

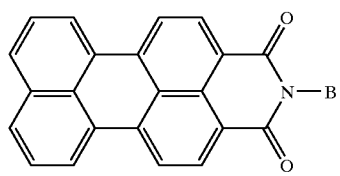

(IIb), in which D is hydrogen, $C_1$–$C_6$alkyl, unsubstituted or halo- or $C_1$–$C_6$alkyl-substituted phenyl, benzyl or phenethyl or B, where B is identical to that described above;

b) quinacridones of the following formula (III)

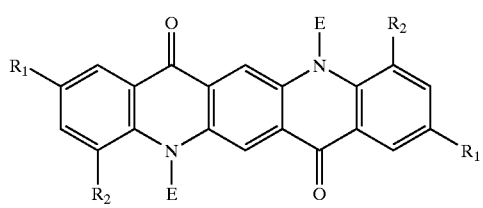

(III), in which $R_1$ and $R_2$ independently of one another are hydrogen, halogen, $C_1$–$C_{24}$alkyl, $C_1$–$C_6$alkoxy or phenyl, and E is hydrogen or a group of the following formula:

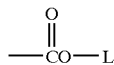

in which L is any suitable solubilizing group, with the proviso that at least one of the groups E is a group other than hydrogen;

c) dioxazines of the following formulae

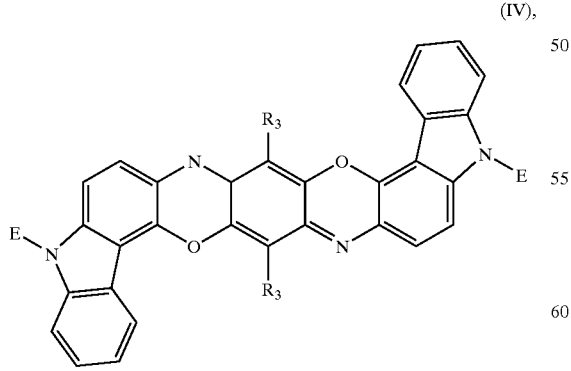

(IV), in which $R_3$ is hydrogen, halogen or $C_1$–$C_{24}$alkyl, and E is identical to that described above,

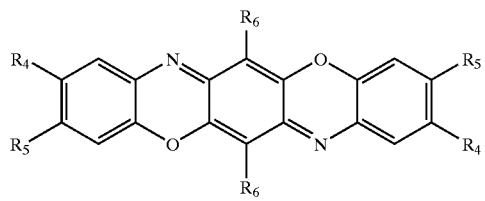

(IVa), in which $R_4$, $R_5$ and $R_6$ independently of one another are hydrogen, $C_1$–$C_4$alkyl, $C_1$–$C_4$alkoxy, $NECOC_1$–$C_4$alkyl, NECOphenyl or $N(E)_2$, where at least one of $R_4$, $R_5$ and $R_6$ is $NECOC_1$–$C_4$alkyl, NECOphenyl or $N(E)_2$, and E is identical to that described above;

d) isoindolines of the following formulae

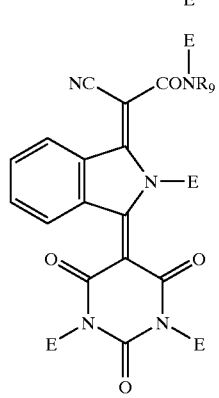

(V),

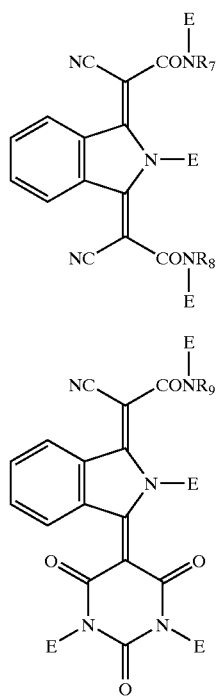

(VI),

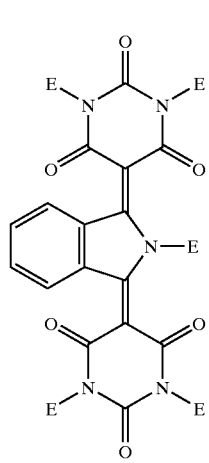

(VII), in which $R_7$ is a group

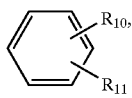

$R_8$ is hydrogen, $C_1$–$C_{24}$alkyl, benzyl or a group

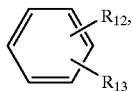

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, and E is identical to that described above;

e) isoindolinones of the following formulae

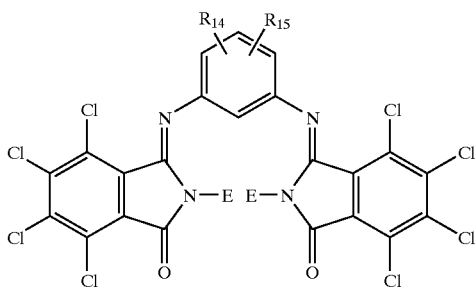
(IXa),

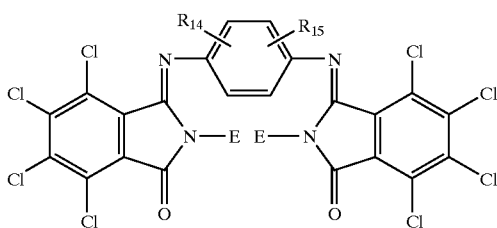
(IXb), in which $R_{14}$ and $R_{15}$ independently of one another are hydrogen, halogen or $C_1$–$C_4$alkyl, and E is identical to that described above;

f) anthraquinoid compounds of the following formulae

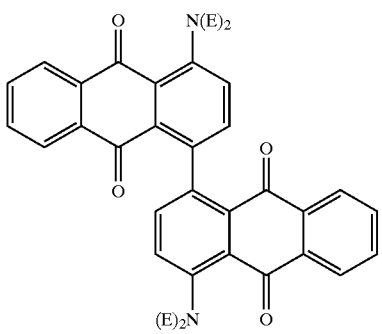
(X),

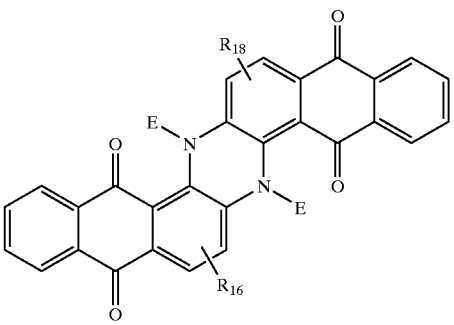
(XI), in which $R_{16}$'s independently of one another are hydrogen or halogen, and E is identical to that described above;

g) phthalocyanines of the following formula

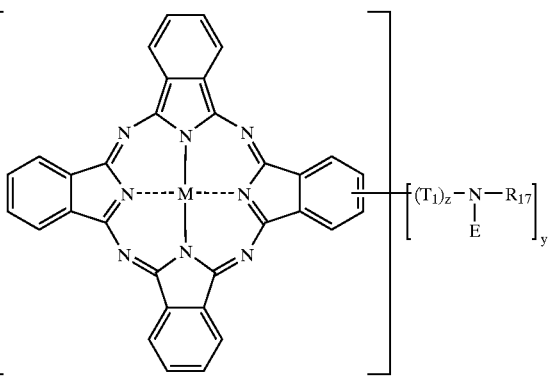
(XII), in which M is $H_2$, a divalent metal selected from the group consisting of Cu (II), Zn (II), Fe (II), Ni (II), Ru (II), Rh (II), Pd (II), Pt (II), Mn (II), Mg (II), Be (II), Ca (II), Ba (II), Cd (II), Hg (II), Sn (II), Co (II) and Pb (II), or a divalent metal oxide selected from the group consisting of V(O), Mn(O) and TiO, $T_1$ is —$CHR_{18}$—, —CO— or $SO_2$—, $R_{17}$ is hydrogen, $C_1$–$C_6$alkyl, —N(E)$R_{18}$, N(E)$_2$, —NECOR$_{19}$, —COR$_{19}$ or a group

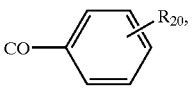

$R_{18}$ is hydrogen or $C_1$–$C_6$alkyl, $R_{19}$ is $C_1$–$C_6$alkyl, $R_{20}$ is hydrogen, halogen, $C_1$–$C_6$alkyl or $C_1$–$C_6$alkoxy, Z is zero or 1, y is an integer of 1 to 8, and E is identical to that described above;

h) pyrrolo[3,4-c]pyrroles of the following formulae

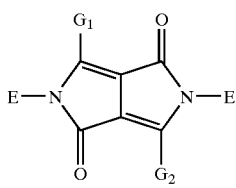
(XIIIa),

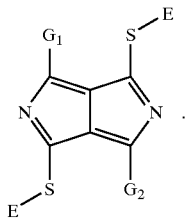
(XIIIb), in which $G_1$ and $G_2$ independently of one another are any of the following groups, and E is identical to that described above:

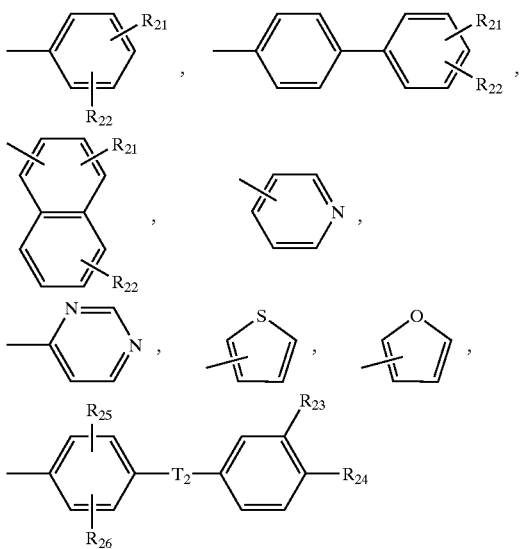

in which $R_{21}$ and $R_{22}$ independently of one another are hydrogen, halogen, $C_1$–$C_{24}$alkyl, $C_1$–$C_6$alkoxy, $C_1$–$C_{18}$alkylmercapto, $C_1$–$C_{18}$alkylamino, —CN, —NO$_2$, phenyl, trifluoromethyl, $C_5$–$C_6$cycloalkyl, —C≡N—($C_1$–$C_{24}$alkyl), a group

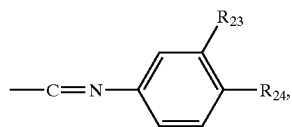

imidazolyl, pyrazolyl, triazolyl, piperadinyl, pyrrolyl, oxazolyl, benzoxazolyl, benzothiazolyl, benzoimidazolyl, morpholinyl, piperidinyl or pyrrolidinyl, $T_2$ is —CH$_2$—, —CH(CH$_3$)—, —CH(CH$_3$)$_2$—, —CH=N—, —N=N—, —O—, —S—, —SO—, —SO$_2$— or —NR$_{27}$, $R_{23}$ and $R_{24}$ independently of one another are hydrogen, halogen, $C_1$–$C_6$alkyl, $C_1$–$C_6$alkoxy or —CN, $R_{25}$ and $R_{26}$ independently of one another are hydrogen, halogen or $C_1$–$C_6$alkyl, $R_{27}$ is hydrogen or $C_1$–$C_6$alkyl:

i) quinophthalones of the following formulae

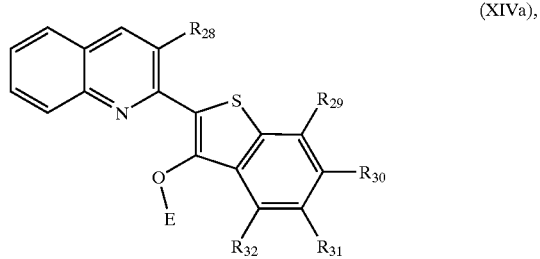
(XIVa),

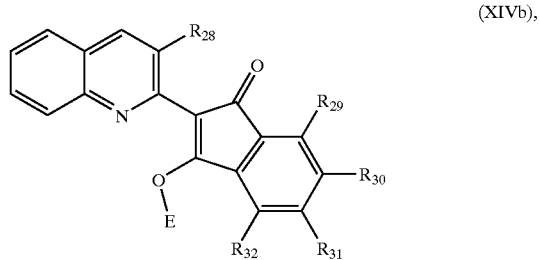
(XIVb), in which $R_{28}$ is hydrogen or O—E, $R_{29}$, $R_{30}$, $R_{31}$ and $R_{32}$ independently of one another are hydrogen, halogen, —COO—$C_1$–$C_6$alkyl or —CONE—$C_1$–$C_6$alkyl, and E is identical to that described above;

j) azo compounds of the following formulae

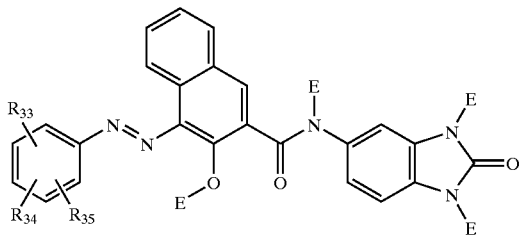
(XVa),

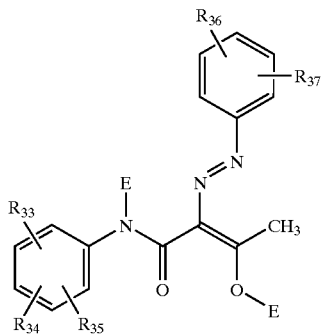
(XVb),

-continued

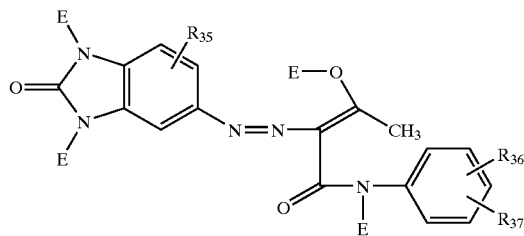
(XVc),

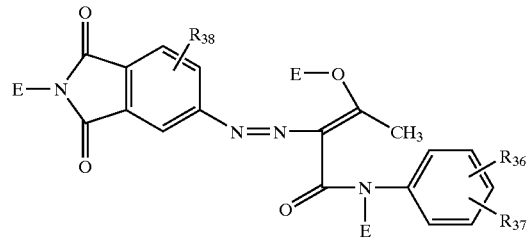
(XVd),

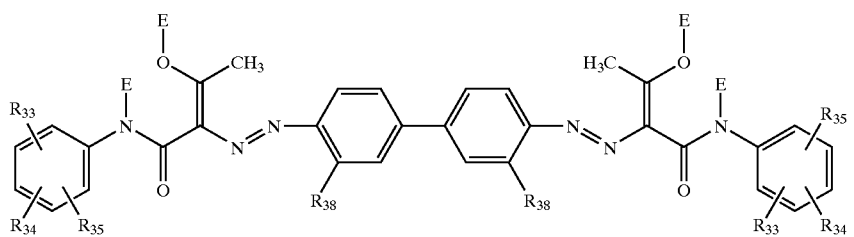
(XVe),

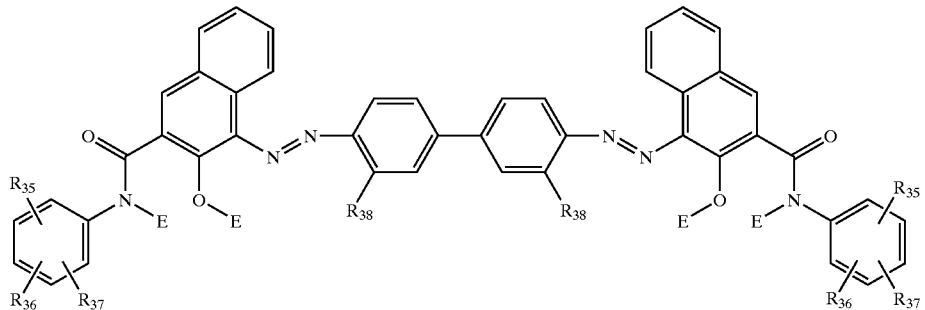
(XVf), in which $R_{33}$, $R_{34}$, $R_{35}$, $R_{36}$ and $R_{37}$ independently of one another are hydrogen, halogen, $C_1$–$C_6$alkyl, $C_1$–$C_6$alkoxy, $NO_2$, acetyl or —$SO_2NE$—$C_1$–$C_6$alkyl, $R_{38}$ is hydrogen, halogen, $C_1$–$C_6$alkyl or $C_1$–$C_6$alkoxy; and E is identical to that described above;

k) anthraquinones of the following formulae

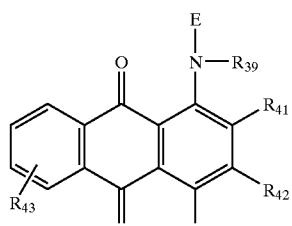
(XVIa),

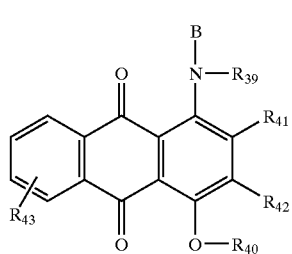
(XVIb), in which $R_{39}$ and $R_{40}$ independently of one another are hydrogen, $C_1$–$C_{12}$alkyl or $C_6$–$C_{12}$aryl which is unsubstituted or substituted by halogen, $C_1$–$C_6$alkyl, $C_1$–$C_6$alkoxy, $NO_2$, acetyl, $SO_2NE$—$C_1$–$C_6$alkyl or —$SO_2NE_2$, $R_{41}$ and $R_{42}$ independently of one another are hydrogen, halogen, $C_1$–$C_6$alkyl, $C_1$–$C_6$alkoxy, $NO_2$, cyano, $CONE_2$, $SO_2NEC_1$–$C_6$alkyl or $SO_2NE_2$, $SO_3E$, $SO_3Na$ or $C_6$–$C_{12}$aryl which is unsubstituted or substituted by halogen, $C_1$–$C_6$alkyl, $C_1$–$C_6$alkoxy, $NO_2$, acetyl, $SO_2NEC_1$–$C_6$alkyl or $SO_2NE_2$, $R_{43}$ is hydrogen, halogen, $NO_2$, cyano, hydroxyl or $C_1$–$C_6$alkoxy; and B and E are identical to that described above; and l) indigo derivatives of the following formula

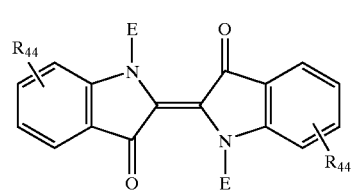
(VIII), in which $R_{44}$ is hydrogen, halogen, cyano, $C_1$–$C_6$alkyl or $C_1$–$C_6$alkoxy, and E is identical to that described above.

3. The process for producing a sintered color pencil lead according to claim 2 in which the —L group in the B group in Formula (I) is any one of the following formulae

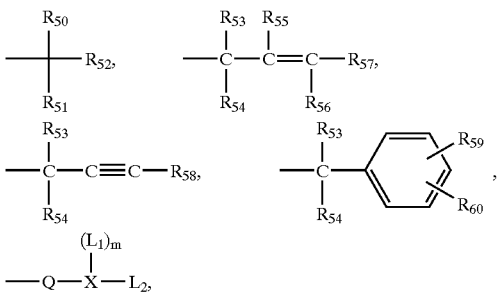

in which $R_{50}$, $R_{51}$ and $R_{52}$ independently of one another are $C_1$–$C_6$alkyl, $R_{53}$ and $R_{54}$ independently of one another are $C_1$–$C_6$alkyl, oxygen-, sulfur- or $N(R_{61})_2$-interrupted $C_1$–$C_6$alkyl, unsubstituted or halo-, $C_1$–$C_6$alkyl-, $C_1$–$C_6$alkoxy-, $NO_2$— or cyano-substituted phenyl or biphenylyl, $R_{55}$, $R_{56}$ and $R_{57}$ independently of one another are hydrogen or $C_1$–$C_6$alkyl, $R_{58}$ is hydrogen, $C_1$–$C_6$alkyl or any of the following groups:

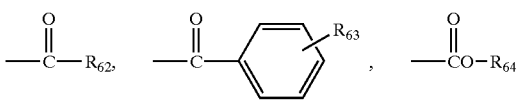

$R_{59}$ and $R_{60}$ independently of one another are hydrogen, halogen, $C_1$–$C_6$alkyl, $C_1$–$C_6$alkoxy, cyano, $NO_2$, $N(R_{61})_2$, unsubstituted or halo-, $C_1$–$C_6$alkyl-, $C_1$–$C_6$alkoxy-, $NO_2$— or cyano-substituted phenyl, $R_{61}$ and $R_{62}$ are $C_1$–$C_6$alkyl, $R_{63}$ is hydrogen or $C_1$–$C_6$alkyl, $R_{64}$ is hydrogen, $C_1$–$C_6$alkyl, unsubstituted or $C_1$–$C_6$alkyl-substituted phenyl, Q is p,q-$C_2$–$C_6$alkylene which is unsubstituted or substituted once or more times by $C_1$–$C_6$alkoxy, $C_1$–$C_6$alkylmercapto or $C_2$–$C_{12}$dialkylamino (where p and q are different numeric locants), X is a heteroatom selected from the group consisting of N, O and S, where m is 0 if X is O or S and is 1 if X is N, $L_1$ and $L_2$ independently of one another are unsubutituted or mono- or poly-$C_1$–$C_{12}$alkoxy, —$C_1$–$C_{12}$alkylmercapto, —$C_2$–$C_{24}$dialkylamino, —$C_6$–$C_{12}$aryloxy, —$C_6$–$C_{12}$arylmercapto, —$C_7$–$C_{24}$alkylarylamino or —$C_{12}$–$C_{24}$diarylamino-substituted $C_1$–$C_6$alkyl, or [-(p',q'-$C_2$–$C_6$alkylene)-Z—]$_n$—$C_1$–$C_6$alkyl (where n is a number of 1 to 1000; p' and q' are different numeric locants; each Z independently of the others is a heteroatom comprising oxygen, sulfur or $C_1$–$C_{12}$alkyl-substituted nitrogen; and all $C_2$–$C_6$alkylenes in the repeating units [—$C_2$–$C_6$alkylene-Z—] can be identical or different), $L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group consisting of halogen, cyano and $NO_2$.

4. The process for producing a sintered color pencil lead according to claim 3 in which the white or light-colored porous sintered lead comprises a colorless or white filler and silicon nitride prepared from a starting material of perhydropolysilazane that is a binder.

5. The process for producing a sintered color pencil lead according to claim 1 in which the —L group in the B group in Formula (I) is any one of the following formulae

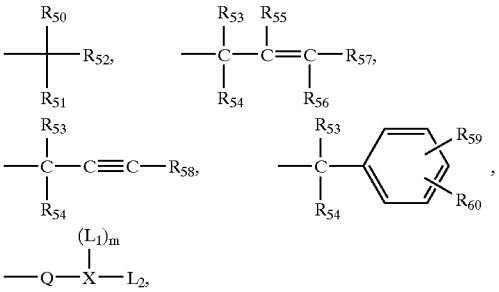

in which $R_{50}$, $R_{51}$ and $R_{52}$ independently of one another are $C_1$–$C_6$alkyl, $R_{53}$ and $R_{54}$ independently of one another are $C_1$–$C_6$alkyl, oxygen-, sulfur- or $N(R_{61})_2$-interrupted $C_1$–$C_6$alkyl, unsubstituted or halo-, $C_1$–$C_6$alkyl-, $C_1$–$C_6$alkoxy-, $NO_2$— or cyano-substituted phenyl or biphenylyl, $R_{55}$, $R_{56}$ and $R_{57}$ independently of one another are hydrogen or $C_1$–$C_6$alkyl, $R_{58}$ is hydrogen, $C_1$–$C_6$alkyl or any of the following groups:

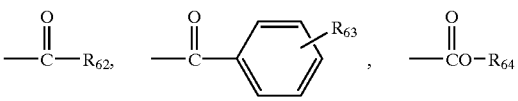

$R_{59}$ and $R_{60}$ independently of one another are hydrogen, halogen, $C_1$–$C_6$alkyl, $C_1$–$C_6$alkoxy, cyano, $NO_2$, $N(R_{61})_2$, unsubstituted or halo-, $C_1$–$C_6$alkyl-, $C_1$–$C_6$alkoxy-, $NO_2$— or cyano-substituted phenyl, $R_{61}$ and $R_{62}$ are $C_1$–$C_6$alkyl, $R_{63}$ is hydrogen or $C_1$–$C_6$alkyl, $R_{64}$ is hydrogen, $C_1$–$C_6$alkyl, unsubstituted or $C_1$–$C_6$alkyl-substituted phenyl, Q is p,q-$C_2$–$C_6$alkylene which is unsubstituted or substituted once or more times by $C_1$–$C_6$alkoxy, $C_1$–$C_6$alkylmercapto or $C_2$–$C_{12}$dialkylamino (where p and q are different numeric locants), X is a heteroatom selected from the group consisting of N, O and S, where m is 0 if X is O or S and is 1 if X is N, $L_1$ and $L_2$ independently of one another are unsubutituted or mono- or poly-$C_1$–$C_{12}$alkoxy, —$C_1$–$C_{12}$alkylmercapto, —$C_2$–$C_{24}$dialkylamino, —$C_6$–$C_{12}$aryloxy, —$C_6$–$C_{12}$arylmercapto, —$C_7$–$C_{24}$alkylarylamino or —$C_{12}$–$C_{24}$diarylamino-substituted $C_1$–$C_6$alkyl, or [-(p',q'-$C_2$–$C_6$alkylene)-Z—]$_n$—$C_1$–$C_6$alkyl (where n is a number of 1 to 1000; p' and q' are different numeric locants; each Z independently of the others is a heteroatom comprising oxygen, sulfur or $C_1$–$C_{12}$alkyl-substituted nitrogen; and all $C_2$–$C_6$alkylenes in the repeating units [—$C_2$–$C_6$alkylene-Z—] can be identical or different), $L_1$ and $L_2$ can be saturated or mono- to deca-unsaturated, uninterrupted or interrupted in any desired points by from 1 to 10 groups selected from the group consisting of —(C=O)— and —C$_6$H$_4$—, and may carry no or 1 to 10 further substituents selected from the group consisting of halogen, cyano and NO$_2$.

6. The process for producing a sintered color pencil lead according to claim 5 in which the white or light-colored porous sintered lead comprises a colorless or white filler and silicon nitride prepared from a starting material of perhydropolysilazane that is a binder.

7. The process for producing a sintered color pencil lead according to claim 2 in which the white or light-colored porous sintered lead comprises a colorless or white filler and silicon nitride prepared from a starting material of perhydropolysilazane that is a binder.

8. The process for producing a sintered color pencil lead according to claim 1 in which the white or light-colored porous sintered lead comprises a colorless or white filler and silicon nitride prepared from a starting material of perhydropolysilazane that is a binder.

* * * * *